United States Patent
Michiels et al.

(10) Patent No.: US 7,874,335 B2
(45) Date of Patent: *Jan. 25, 2011

(54) TIRE WITH CAP PLY LAYER

(75) Inventors: Dany Michiels, Haaltert (BE); Geert Broos, St. Amandsberg (BE); Willy Delanoy, Drongen (BE); Werner K. Hess, Deurle (BE); Boudewijn Snauwaert, Drongen (BE)

(73) Assignee: Milliken & Company, Spartanburg, SC (US)

( * ) Notice: Subject to any disclaimer, the term of this patent is extended or adjusted under 35 U.S.C. 154(b) by 818 days.

This patent is subject to a terminal disclaimer.

(21) Appl. No.: 11/881,590

(22) Filed: Jul. 27, 2007

(65) Prior Publication Data

US 2007/0267119 A1 Nov. 22, 2007

Related U.S. Application Data

(63) Continuation of application No. 11/233,660, filed on Sep. 23, 2005, now Pat. No. 7,252,129, which is a continuation-in-part of application No. 11/063,212, filed on Feb. 22, 2005, now abandoned.

(51) Int. Cl.
*B60C 9/22* (2006.01)
*B60C 9/18* (2006.01)
(52) U.S. Cl. .................... 152/531; 152/533
(58) Field of Classification Search ............... 152/531, 152/533
See application file for complete search history.

(56) References Cited

U.S. PATENT DOCUMENTS

| 3,991,803 A | 11/1976 | Praszek |
| 4,073,330 A | 2/1978 | Allard |
| 4,201,260 A | 5/1980 | Mirtain et al. |
| 4,498,514 A | 2/1985 | Maathuis et al. |
| 4,635,696 A | 1/1987 | Gasowski et al. |
| 4,739,814 A | 4/1988 | Berczi et al. |
| 5,032,198 A * | 7/1991 | Kojima et al. ........... 152/531 X |
| 5,365,988 A | 11/1994 | Soderberg et al. |
| 5,407,701 A | 4/1995 | Reuter |
| 5,437,321 A * | 8/1995 | Breny .................... 152/533 X |
| 6,533,012 B1 | 3/2003 | Jardine et al. |
| 6,799,618 B2 | 10/2004 | Reuter et al. |
| 7,252,129 B2 * | 8/2007 | Michiels et al. ............. 152/531 |

FOREIGN PATENT DOCUMENTS

| EP | 0 624 667 | 11/1994 |
| GB | 1 418 558 | 7/1973 |
| GB | 2 139 574 | 11/1984 |
| JP | 9-156326 | 6/1997 |
| KR | 2001-0090127 | 10/2001 |

(Continued)

*Primary Examiner*—Adrienne C Johnstone
(74) *Attorney, Agent, or Firm*—Cheryl J. Brickey

(57) ABSTRACT

A pneumatic tire has a tread, a carcass with belt plies disposed below the tread, and a cap ply layer between the tread and the belt plies of the carcass. The cap ply is a leno weave tape having warp yarn in the longitudinal direction and weft yarns in the weft direction. The leno weave tape is wound in a flat helically wound around the belt plies, and cover with a tread of the tire.

12 Claims, 4 Drawing Sheets

FOREIGN PATENT DOCUMENTS

| | | |
|---|---|---|
| KR | 2003-0019978 | 3/2003 |
| RU | 2 209 139 | 7/2003 |
| WO | 99/48706 | 9/1999 |
| WO | 2004/081269 | 9/2004 |
| WO | 2005/002883 | 1/2005 |

* cited by examiner

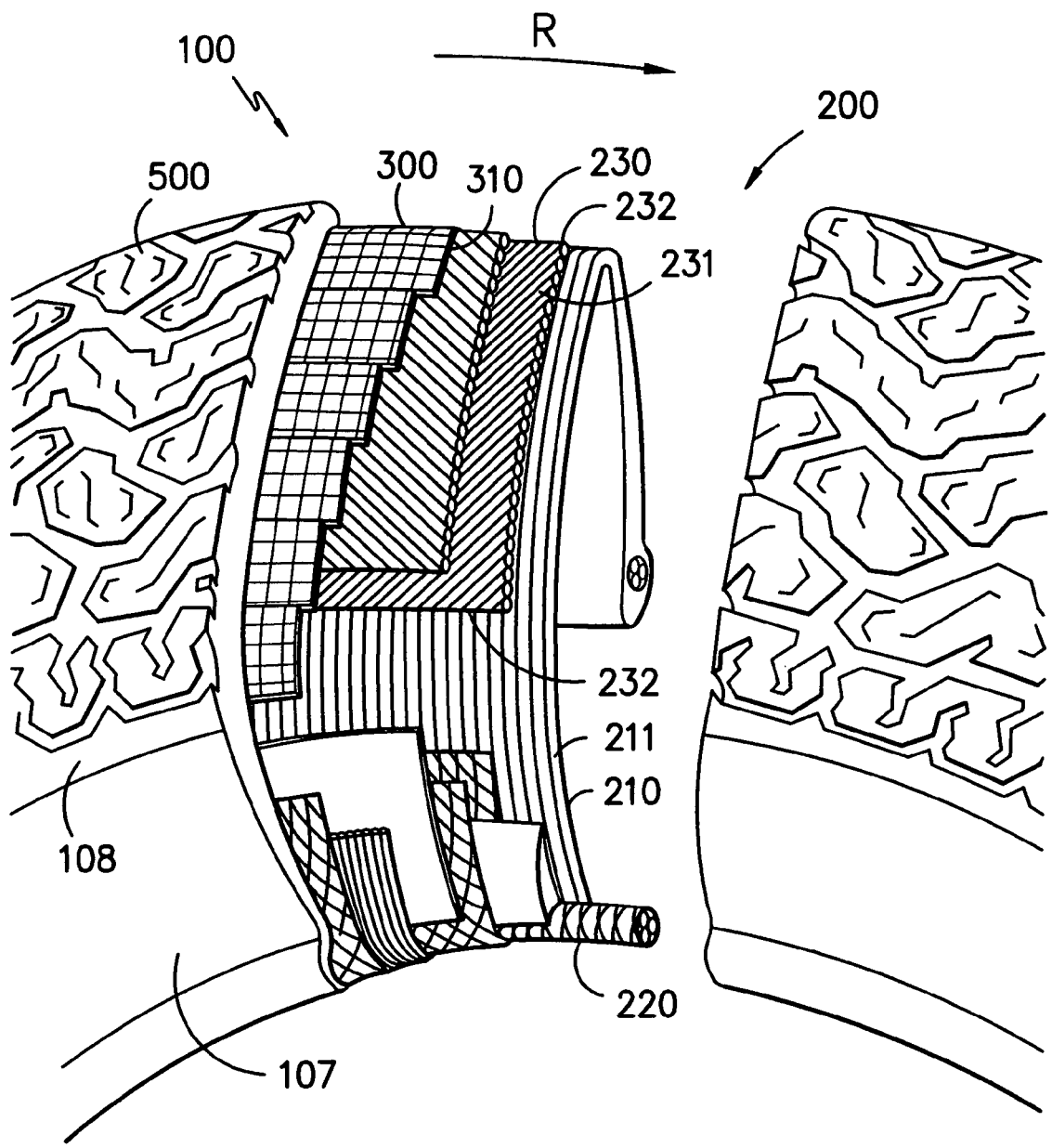
FIG. -1-

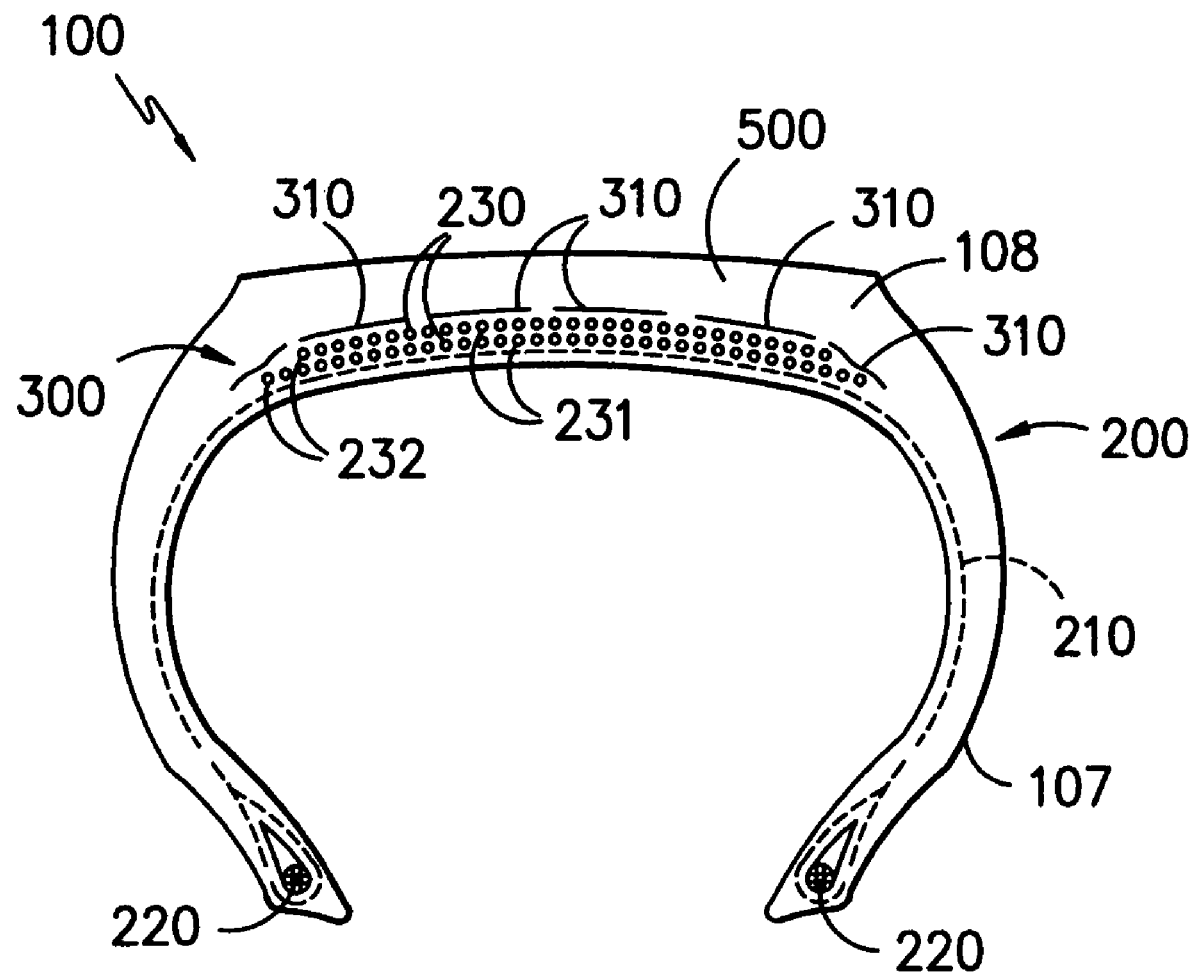
FIG. -2-

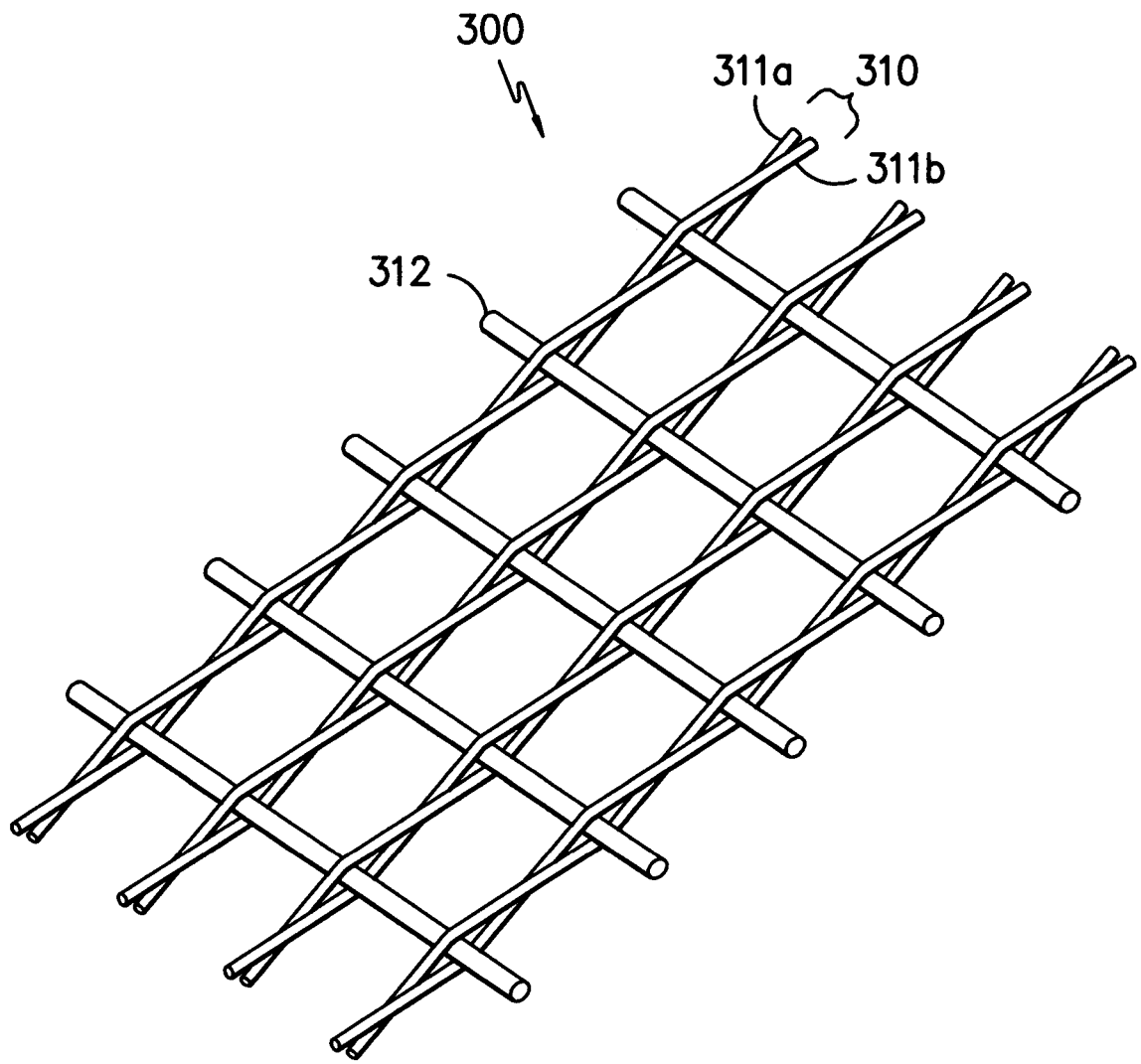
FIG. -3-

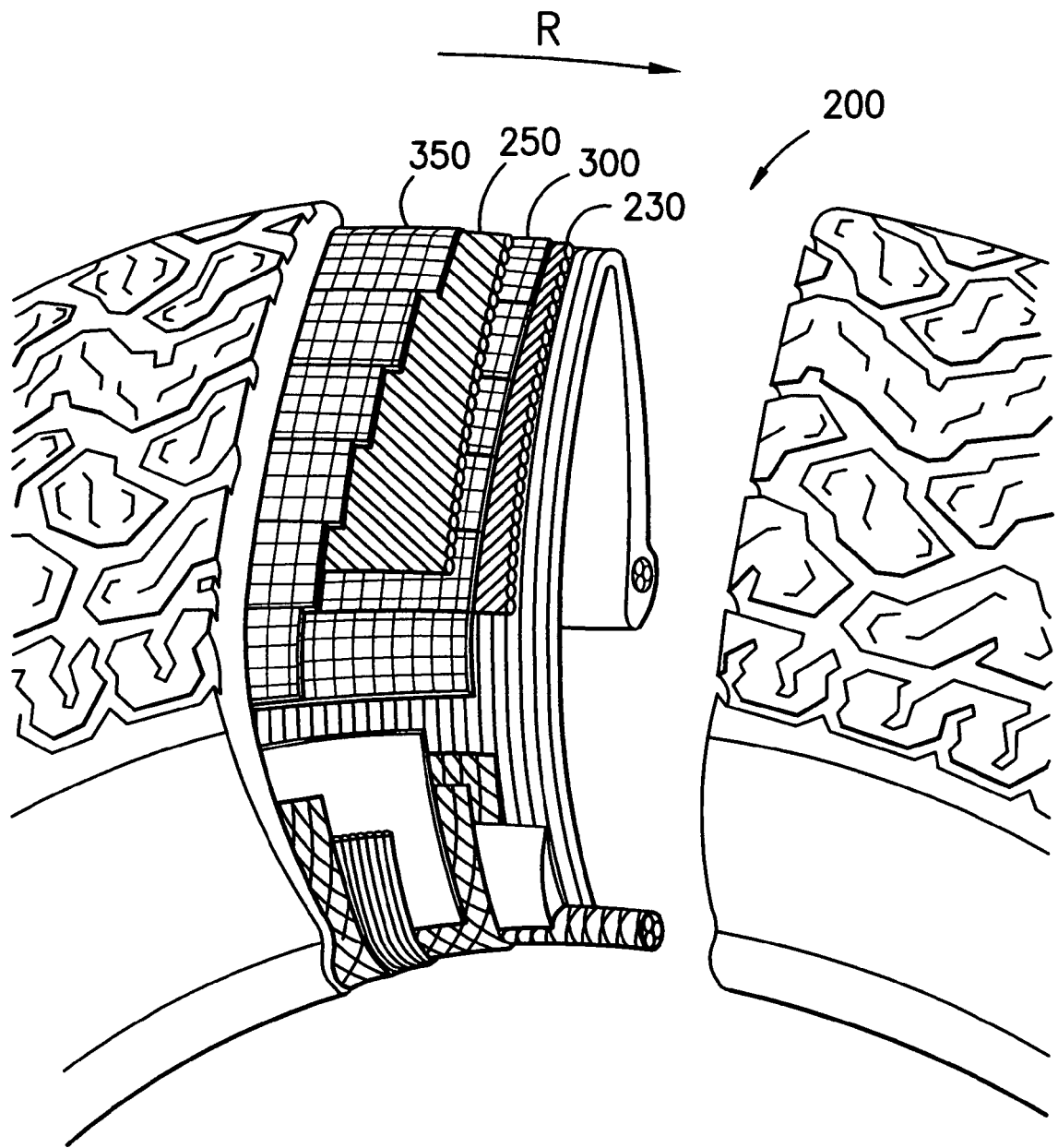
FIG. -4-

TIRE WITH CAP PLY LAYER

CROSS REFERENCE TO RELATED APPLICATIONS

This application is a Continuation of U.S. Ser. No. 11/233,660, now U.S. Pat. No. 7,252,129, filed on Sep. 23, 2005, which is a Continuation-In-Part of U.S. Ser. No. 11/063,212 filed on Feb. 22, 2005, now abandoned. Priority is hereby claimed to both of such applications.

BACKGROUND

The present invention generally relates to pneumatic tires, and in particular, to construction of ply tires with belt plies.

Typically, tires are manufactured from a single or multiply carcass of substantially U-shaped section having metal beads at the inner perimeters of the walls. Support can be provided to a tire carcass by steel cord belt plies extending around the outer periphery of the carcass and across the width of the tread. Such steel belt plies are relatively inextensible in the intended direction of rotation of the tire and include steel belt cords disposed parallel to that direction or at a low angle thereto. The belt plies act to restrict the movement of the tread and give the tire better road-holding properties. Support such as this type is particularly important in a radial tire, where the carcass is formed from a rubberized woven fabric having relatively inextensible reinforcing cords running transversely, i.e. radially, from bead to bead.

Technical difficulties have been encountered in incorporating steel belts into the tread area of the tire. One of the difficulties lies in ensuring good adhesion between the steel and the rubber. The centrifugal force of the steel belts can cause difficulty in the adhesion of the belt within the tire. Additionally, movement of the steel belts at higher speeds tends to create excessive temperatures in the tire, which can cause tread failure and delamination. The problem of delamination is particularly noticeable in the shoulder area of the tire.

One solution of the problem previously used by tire manufactures is to use a layer of calendared fabric laid circumferentially over the belt. This calendared fabric can also be used with wide fabric strips placed over the shoulder area of the tire, retaining the edges of the steel belt in a specific location of the tire. An example of this type of tire can be found in U.S. Pat. No. 4,284,117, issued to Poque et al. on 18 Aug. 1981. In order to cover all of the circumference of the tire and be retained in place, the prior art fabric must overlap itself across the width of tire at some location on the circumference. The overlapping area helps retain the prior art fabric around the circumference of the tire. However, because this type of overlapping adds weight, the potential length of the overlap is limited. A shorter overlap limits the length of the fabric and thereby the strength that the fabric can give to the tire. Additionally, the overlapping section of the fabric causes an uneven thickness of the fabric around the circumference.

To overcome this difficulty, a rubber tape was formed that had cords disposed longitudinally within the tape, and was wound around the belt plies and across the width of the tire. An example of this type of tire can be found in WO 2005/002883, filed by Pirelli Pneumatic S.P.A., and published on 13 Jan. 2005. The continuous nature of the tape provided greater strength. However, the longitudinal yarns were positioned in a spaced apart relationship by the rubber of the tape, which does not provide resistance to the separation of the yarns by items that probe at the area between the yarns.

The present invention provides a solution to obviate or mitigate these difficulties of the prior art.

Hence, as a solution to overcome the above difficulties, the present invention provides a pneumatic tire 100 comprising a tread 500, a carcass 200 having at least one belt ply 230 disposed below the tread 500, and a cap ply 300 located between the carcass 200 and the tread 500, wherein the cap ply comprises at least one layer made of an open construction leno weave tape 310 having warp yarns in the longitudinal direction and weft yarns in weft direction, disposed in a flat helical pattern around the circumference of the carcass 200 in the area of at least one belt ply 230. Preferably, the leno weave tape has a width of about 5 mm to about 25 mm.

BRIEF DESCRIPTION OF THE DRAWINGS

An embodiment of the present invention will now be described by way of example, with reference to the accompanying drawings, in which:

FIG. 1 is a cutaway partial view of a pneumatic radial tire illustrating one embodiment of the invention;

FIG. 2 is a cross-sectional view corresponding to FIG. 1;

FIG. 3 is an enlarged cutaway partial view of a leno tape for use in the tire of FIG. 1;and, FIG. 4 is a cutaway partial view of a pneumatic tire according to another embodiment of the present invention.

DETAILED DESCRIPTION

Referring now to the drawings, and in particular to FIGS. 1 and 2, there is shown a tire 100, comprising side walls 107 joined to a tread 500 by shoulders 108. The tire 100 includes a carcass 200 covered by the tread 500. In FIGS. 1 and 2, the tire 100 is a radial tire. However, the present invention is not limited to radial tires and can also be used with other tire constructions. The carcass 200 is formed from one or more plies of tire cord 210 terminating at the inner periphery of the tire in metal beads 220, with at least one belt ply 230 located circumferentially around the tire cord 210 in the area of the tread 500. The tire cord 210 is a rubberized woven fabric having its warps formed from relatively inextensible reinforcing cords 211. In the tire shown in FIG. 1, the carcass 200 is constructed so that the reinforcing cords 211 are running substantially radially of the intended direction of rotation R of the tire 100. The belt plies 230 are formed with relatively inextensible warp materials 231, such as steel cord reinforcing warps, which run in the intended direction of rotation R of the tire or, more usually, at a slight angle thereto. The angle of the inextensible warp materials 231 can vary with the method of construction or application. The belt plies 230 extend across the width of the tread 500 of the tire terminating in edges 232 in the area of the shoulder 108 of the tire 100, i.e. the area where the tread 500 meets the side wall 107.

In the present invention, a cap ply layer 300 is located between the belt plies 230 and the tread 500. The cap ply layer 300 is formed from a leno tape 310 which is wound circumferentially around the carcass 200 of the tire 100 in a flat helical pattern. As illustrated in FIG. 4, the leno tape 310 includes warp yarn pairs 311 and weft yarns 312. Each warp yarn pair has warp yarns 311a and 311b which twist around each other between fill yarns 312.

The warp yarn pairs 311 extend longitudinally along the leno tape 310, which also warp around the carcass 200 due to the wrapping of the leno tape 310 around the carcass 200. It is the warp yarns 311a and 311b that provide most of the reinforcement of the cap ply layer 300. The construction, material, size, and spacing of the warp yarns 311a and 311b are selected such that they provide the desired strength of the cap ply layer 300 to prevent the belt ply 230 from moving outward in the tire 100 and to protect the rubber in the tire 100 from sharp portions of the belt plies 230. The warp yarns 311*a* and 311*b* can be a spun staple yarn, a multifilament yarn, and/or a monofilament yarn and are formed of a material which will restrain the belt plies 230. Preferred examples of suitable materials for the warp yarns 311*a* and 311*b* include polyamide, aramides (including meta and para forms), nylon, polyester, polyvinyl acetate, nylon (including nylon 6, nylon 6,6, and nylon 4,6), polyethylene naphthalate (PEN), cotton, and rayon. The weft yarns 312 hold the warp yarn pairs 311 in the desired spaced apart relationship. The weft yarn 312 can be a spun staple yarn, a multifilament yarn, and/or a monofilament yarn. Preferred examples of suitable materials for the weft yarns 312 include cotton, rayon, polyester, polyamide, aramides (including meta and para forms), nylon, polyvinyl acetate, nylon (including nylon 6, nylon 6,6, and nylon 4,6), and PEN. The weft and/or warp yarns may also be hybrid yarns. These hybrid yarns are multiply yarns, being made up of at least 2 fibers of different fiber material (for example, cotton and nylon). These different fiber materials can produce hybrid yarns with different chemical and physical properties. Hybrid yarns are preferred because they are able to change the physical properties of the final product they are used in. Some preferred hybrid yarns are an aramide fiber with a nylon fiber, an aramide fiber with a rayon fiber, and an aramide fiber with a polyester fiber.

As illustrated in FIG. 3, the construction of the leno tape 310 is a leno weave. In a leno weave, warp yarns are arranged in pairs with one twisted around the other between fill yarns. In the leno weave 310, the leno weave pattern helps securely hold the warp yarn pairs 311 and weft yarns 312 at the desired space apart position. The leno weave pattern also allows the warp yarns to have a mechanical resiliency in the leno tape 310. As used herein, mechanical resiliency of a yarn is the ability of the yarn to displace longitudinally without an elastic deformation of the material. Mechanical resiliency allows the leno tape 310 to have a minor amount of resilient elongation for compatibility with the tire, but use the stronger yarns in the cap ply layer 300 that is usually associated with low elongation yarn material.

The leno tape 310 is constructed with a width preferably of about 5 mm to 25 mm. More preferably, the leno tape 310 is constructed with a width of about 8 mm to 15 mm. The present inventors have discovered that the width of the leno tape 310 is critical to form a uniform flat layer of the leno tape 310 across the surface of the carcass 200 of the tire 100. In the helical wrapping process, wider strips will cause buckles on the leading edge of the wrap due to excessive width of the materials. Shorter widths provide difficulties in manufacturing the tire 100 due to an excessive number of revolutions necessary in the wrapping procedure to achieve the desired coverage of the carcass 200 with the leno tape 310.

The leno tape 310 is an open construction fabric which permits the strike through of the rubber in the tire 100 for a better bonded construction. The openness of the fabric used for the leno tape 310 is usually determined by the spacing and character of the warp yarn pairs 311. The weft yarns 312 are typically spaced as necessary to maintain the position of the warp yarns 311. In one embodiment where the fabric is a 110 warp (55 pairs)/22 weft fabric, the warp yarns are 940/1 detex polyarmide, the weft yarns are 1220/1 detex rayon, the pairs of warp yarns 311 are spaced about 1.3 mm apart, and the weft yarns 312 are spaced about 3 mm apart, such that the mean opening size is about 3.9 mm². The warp yarn and/or weft yarn spacing in such and embodiment will be within about ±5%. In another embodiment where the fabric is a 40 warp (20 pairs)/5 weft fabric, the pairs of warp yarns 311 are spaced 4 mm apart and the weft yarns 312 are spaced 10 mm apart to provide a mean opening size of 40 mm². In yet another embodiment where the fabric is a 150 warp (75 pairs)/25 weft fabric, the pairs of warp yarns 311 are spaced 0.3 mm apart and the weft yarns 312 are spaced 10 mm apart to provide a mean opening size of 0.8 mm².

The flat helical pattern typically will need more than three full revolutions of the leno tape 310 around the carcass 200 of the tire 100. The length of leno tape 10 will depend on the diameter of the tire 100, the width of the leno tape 310, and the amount of coverage provided by the leno tape 310. The approximate minimum length of a leno tape 310 in a cap ply layer 300, with only one layer of leno tape 310 and no gaps or over lapping regions, can be calculated according to the following formula:

$$length = 2\pi rw/t$$

where $\pi$ is 3.14, r is the radius of the tire, w is the width of the area of the tire to be covered, and t is the width of the tape. As an example, for a 185/60/R14 tire, the length of a 13 mm wide leno tape 310 would be a minimum of about 15 linear meters in length, and can have an additional amount of about 2-3 meters for overlapping itself in the shoulder area.

Greater strength can be built into the leno tape 310 by constructing the leno tape 310 such that the warp yarns 311*a* and 311*b* of the outermost warp yarn pairs 311 in the leno tape 310, run longitudinally for the length of the leno tape 310 as continuous uncut yarns. Even greater strength can be built into the leno tape 310 by constructing the leno tape 310 with all of the warp yarns 311*a* and 311*b* run longitudinally the length of the leno tape 310 as continuous uncut yarns.

The leno tape 310 can preferably be treated with an adhesion promoter. Typical examples of adhesion promoters included resorcinol formaldehyde latex (RFL), isocyanate based material, epoxy based material, and materials based on melamine formaldehyde resin.

The leno tape 310 can also have a tackified finish applied for facilitating adhesion, or green tack, during the building process of the green tire. The selection of materials for the tackified finish will depend greatly upon the materials selected for use in the tire, and the skilled person on the basis of his common knowledge can easily determine them appropriately. Tackified finishes can be achieved by various methods such as coating the fabric in an aqueous blend of rosin and rubber lattices, or with a solvent solution of an un-vulcanized rubber compound.

Preferably, the leno tape 310 is located edge to edge as it is laid on the carcass 200 of the tire 100, and is wrapped around the entire belt ply 230 area of the tire 100. In one embodiment, the leno tape 100 is wrapped around the carcass 200 of the tire 100 such that the cap ply layer 300 extends beyond the edges 232 of the belt plies 230, under the shoulder 108 area of the tire 100. Overlapping the edge 232 of the belt 230 with the leno tape 310 provides support to the edges 232 of the belt 230 where excessive temperature can build up.

Additionally, the cap ply layer 300 can comprises multiple layers, e.g. two, three, or even more layers, of the leno tape 310 that are wound over the ply layer 230 of the carcass 200 to provide extra strength. In one embodiment, the leno tape 310 is laid into a double layer in the shoulder 108 area of the tire 100, providing additional strength at the edges 232 of the belt 230. In another embodiment, the cap ply layer 300 can have two layers of leno tape 310 securing the belt ply 230 across the width of the tire 100. When more than one layer of leno tape 310 is used for the cap ply 300, a layer of unvulcanized rubber is placed between the layers of leno tape 310 to insure a good bond. Also, in an embodiment where multiple layers of the leno tape 310 are used, the layers of leno tape 310 can be staggered so that upper strips of leno tape 310 cover the edges of the leno tape 310 in the lower layer.

The cap ply layer 300 of the present invention can be used with one belt ply, two belt plies (as illustrated in FIGS. 1 and 2), or more than two belt plies below the cap ply layer 300. In an alternate embodiment of the present invention illustrated in FIG. 5, the tire 100 can have multiple belt plies 230 and 250 with cap ply layers 300 and 350, disposed over each belt ply layer creating alternating layers of belt plies and cap plies. In the alternate embodiment, the cap ply layer can also overlap the edge of the underlying belt ply, and/or have multiple layers of leno tape (which can also be staggered so that upper strips overlap edges on lower strips).

The formation of the leno tape 310 begins with the acquisition of the basic yarns for the fabric. Subsequently, the yarns are twisted to provide additional mechanical resilience. After the twisting, warp yarns 311a and 311b are placed on a large beam for the formation of the fabric. The fabric is formed by leno weaving with the appropriate spacing of the warp yarn pairs 311. The fabric is formed in large widths, such as 61.4 inches. After the fabric formation, the fabric is finished with adhesive promoter, such as an RFL treatment. If a tackified finish is desired, this is provided following the adhesive promoter finishing. The final fabric is slit into the specific leno tape 310 widths for placement on a spool. Cross-winding the leno tape 310 across a cardboard tube provides a convenient package for subsequent removal of the leno tape 310 in the manufacturing process of tire 100.

In the tire formation process, the tire carcass 200 is formed with the tire cord 210, metal beads 220, and belt plies 230. After the tire carcass 200 is formed, the leno tape 310 is wound from the package around the belt plies 230 to form the cap ply layer 300. After the cap ply layer 300 is placed on the tire carcass 200, the tread 500 is molded onto the subassembly, and the tire 100 is completed.

The present invention overcomes the difficulties of the prior art. Because of the flat helical pattern of the leno tape, there is no overlap area that extends across the width of the tire. Also, the leno tape is wrapped around the circumference of the tire many times, providing a stronger reinforcement to the belt ply. Furthermore, leno weave of the tape secures the warp yarns to the weft yarns, providing a greater resistance to the separation of the warp yarns.

What is claimed is:

1. A pneumatic tire comprising a tread, a carcass having at least one belt ply disposed below the tread, and a cap ply located between the carcass and the tread, wherein the cap ply comprises:

a first layer of an open construction leno weave tape having warp yarns in the longitudinal direction and weft yarns in the weft direction, disposed in a flat helical pattern around the circumference of the carcass in the area of the belt ply, wherein the leno weave tape has a width in a range of from about 5 mm to about 25 mm, wherein the leno weave tape makes more than three full revolutions around the circumference of the tire carcass;

a second layer of an open construction leno weave tape having warp yarns in the longitudinal direction and weft yarns in the weft direction, disposed in a flat helical pattern around the circumference of the carcass in the area of the belt ply, wherein the leno weave tape has a width in a range of from about 5 mm to about 25 mm, wherein the leno weave tape makes more than three full revolutions around the circumference of the tire carcass; and, wherein the first and second layers of leno weave tape are staggered so that the leno weave tape in the second layer cover the edges of the leno weave tape in the first layer, wherein the weft yarns in the first layer of leno weave tape comprise hybrid yarns.

2. The tire according to claim 1, wherein the leno weave tape has a width in a range of from about 8 mm to about 15 mm.

3. The tire according to claim 1, wherein the warp yarns of the leno weave tape in the first layer are continuous for the length of those leno weave tapes.

4. The tire according to claim 1, wherein the outside edges of the leno weave tape in the first layer each have a pair of warp yarns which are continuous for the length of those leno weave tapes.

5. The tire according to claim 1, wherein the leno weave tape in the first and second layers further include an adhesion promoter disposed thereon.

6. The tire according to claim 1, wherein the tire includes a layer of rubber between the layers of the leno weave tapes.

7. The tire according to claim 1, wherein the leno weave tape extends over the edge of the belt ply.

8. The tire according to claim 1, wherein the warp yarns in the first layer of leno weave tape comprise hybrid yarns.

9. The tire according to claim 8, wherein the hybrid yarns comprise at least two fibers of different fiber materials.

10. The tire according to claim 8, wherein the hybrid yarn comprises an aramid fiber and one fiber from the group consisting of polyester, nylon, and rayon.

11. The tire according to claim 1, wherein the hybrid yarns comprise at least two fibers of different fiber materials.

12. The tire according to claim 1, wherein the hybrid yarn comprises an aramid fiber and one fiber from the group consisting of polyester, nylon, and rayon.

* * * * *